Figure 1:
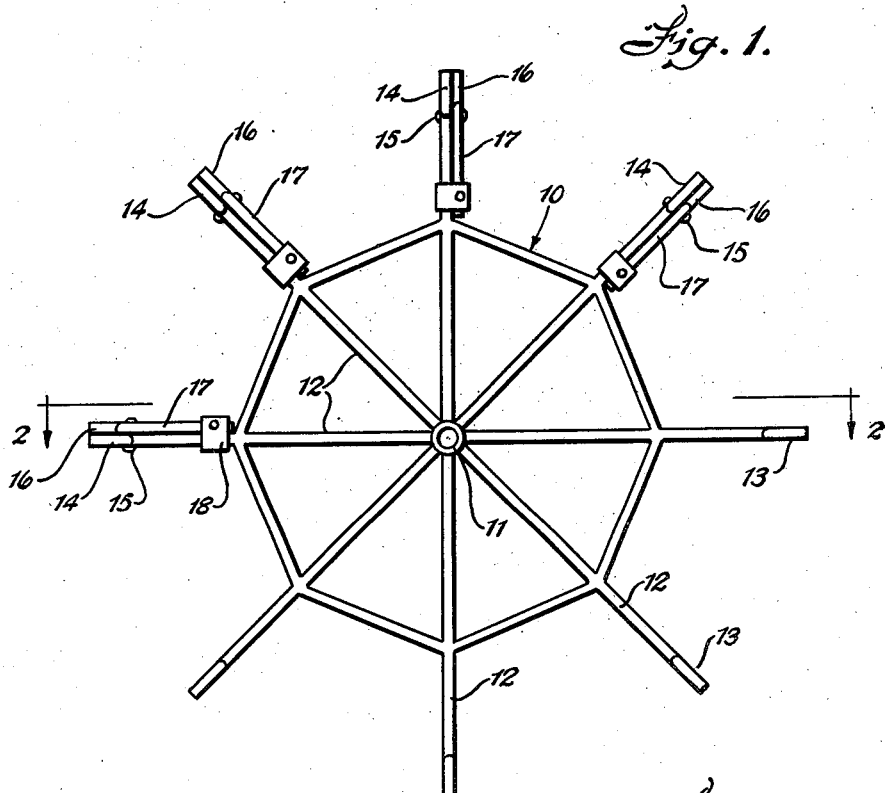

May 18, 1948.  A. W. JOHNSON  2,441,883
WIRE REEL
Filed May 28, 1946  2 Sheets-Sheet 2

Inventor
Algot W. Johnson.

By Clarence A. O'Brien
and Harvey B. Jacobson
Attorneys

Patented May 18, 1948

2,441,883

UNITED STATES PATENT OFFICE 2,441,883

WIRE REEL

Algot W. Johnson, Star Prairie, Wis.

Application May 28, 1946, Serial No. 672,819

2 Claims. (Cl. 242—111)

1

This invention relates to a wire reel and more particularly to a reel employed for reeling fence wire and the like.

The primary object of the invention is to reel fence wire and the like into coils of successive convolutions which may be readily stored for subsequent use.

Another object is to enable the reel to be used to coil the wire and permit the coils to be removed from the reel so as to free the reel for further use.

The above and other objects may be attained by employing this invention which embodies among its features a reel comprising a hub, equally spaced arms radiating from the hub and U-shaped heads on the outer ends of the arms forming cradles in which coils of a wire are adapted to lie.

Other features include L-shaped heads on certain of the arms to which are pivoted at their junction with the arms, L-shaped members which cooperate with the L-shaped heads in holding the wire on the reel during the coiling process, said L-shaped members being adapted to be swung about their pivots to permit the coiled wire to be removed from the reel so that the reel may be used in coiling other wire.

Still other features include a reel to which a bifurcated handle may be attached so that the reel may be rolled along the ground and guided by the handle.

Still other features include mounting the reel on a truck or the like vehicle in such a manner that it will rotate about a horizontal axis while paying off wire which may have been coiled thereon.

In the drawings:

Figure 1 is a side view of a reel embodying the features of this invention.

Figure 2:
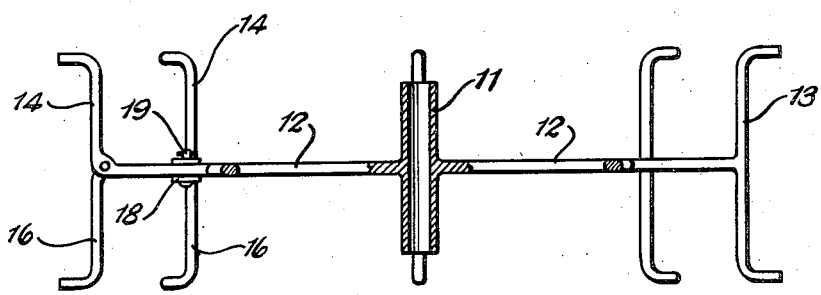
Figure 3:
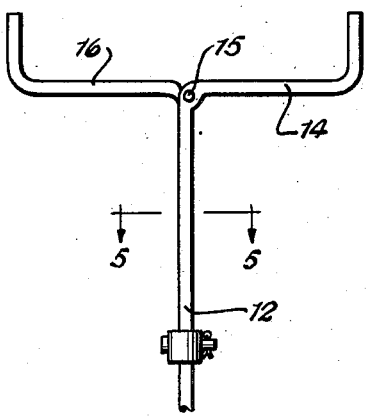
Figure 4:
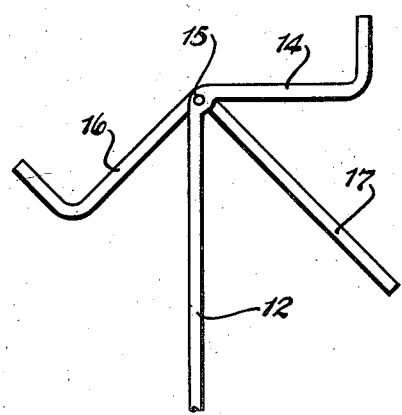
Figure 5:
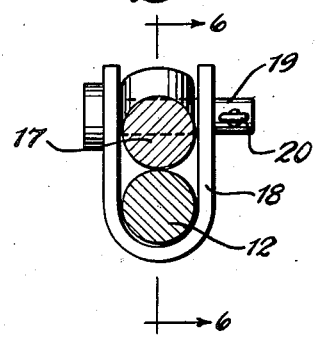
Figure 6:
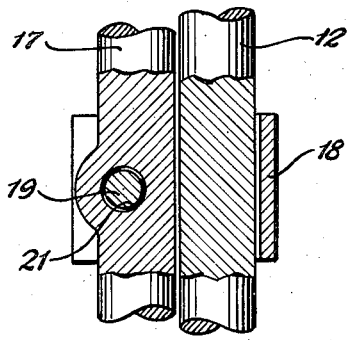

Figure 2 is a top plan view thereof, certain portions being broken away to more clearly illustrate the details of construction, Figure 3 is an enlarged view of one of the arms, showing the L-shaped head and L-shaped member which cooperates therewith in forming a wire cradle, Figure 4 is a view similar to Figure 3 showing the L-shaped member in a position to permit the discharge of a coil of wire from a reel, Figure 5 is an enlarged sectional view taken substantially along the line 5—5 of Figure 3, and Figure 6 is a sectional view taken substantially along the line 6—6 of Figure 5.

Referring to the drawings in detail, my improved reel designated generally 10 comprises a hub 11 consisting of a hollow tubular body open at opposite ends, and from which hub radiates equally spaced arms 12 certain of which terminate in U-shaped heads 13, with the legs of the U turned outwardly and lying in a plane with its respective arm to form a cradle in which coils of wire are adapted to lie. In its present form, the invention is illustrated as having eight radiating arms 12, four of which are equipped with the U-shaped heads 13 forming a cooperating group around one side of the reel.

Each of the other four arms 12 is provided at its extreme outer end with an L-shaped head 14, one leg of which lies parallel with the longitudinal axis of the hub 11 while the opposite leg extends outwardly along an axis parallel with the axis of its respective arm 12. Pivotally connected as at 15 to each arm 12 carrying an L-shaped head 14 at the junction of the arm with its respective L-shaped head is an L-shaped member 16 carrying a lever arm 17 by means of which the L-shaped member 16 may be swung about its pivot 15. When the reel is in wire reeling position the arm 17 is swung about the pivot 15 into parallel relation with its respective arm 12 and when in this position, the L-shaped member 16 cooperates with the L-shaped head 14 in forming a wire receiving cradle, as will be readily understood upon reference to the drawings.

In order to hold the lever arm 17 in parallel relation with the arm 12, I mount on the arm 12 a yoke 18 comprising a U-shaped body which as illustrated in Figures 5 and 6 embraces the arm 12 as will be readily understood upon reference to Figure 5, and this yoke is provided adjacent the free ends of its legs with an opening for the reception of a retaining pin 19 which is held in position therein by a cotter pin 20. The arm 17 is pierced with an opening 21 through which the pin 19 is thrust when it is desired to lock the member 16 in cradle forming relation with the head 14.

In use, it will be understood that the arms 17 of the respective L-shaped members 16 are locked to hold the L-shaped members in cooperative relation with the L-shaped heads 14 to form cradles in which the wire to be coiled is received. The device is then placed on the ground so that the legs of the U-shaped heads 13 straddle the wire and the latter is then attached to one of the heads sufficient to cause it to wind about the reel as the reel is advanced longitudinally of the wire. After the length of wire has been coiled it readily may be removed from the reel by releasing the arms 17 and permitting them to swing about their pivots so as to move the L-shaped members 16 into a position substantially as shown in Figure 4. The wire coil may readily be slipped off the reel and upon restoring the lever arm 17 to its initial position and locking it in place with its respective yoke 18 it is obvious that the reel may again be used for coiling another wire. In this way, the reel may be used repeatedly in producing wire coils which may readily be removed from the reel and stored at a convenient point ready for reuse.

Obviously, should it be so desired the reel may be mounted on a truck or like vehicle by introducing a bolt through the hub and attaching it to any suitable upright member on the vehicle so that wire may be payed out off of the reel by simply driving the vehicle away from a fixed end of the wire. It is also obvious that should it be so desired, a bifurcated handle may be attached to the hub so that the reel may be pushed along the ground during the process of coiling fence wire or the like. Due to the compact nature of the device it may be steered between rocks, boulders or like obstructions commonly encountered in areas in which wire fences and the like are used.

What I claim is:

1. A wire reel comprising a hub, equally spaced arms radiating from the hub, U-shaped heads on the outer ends of certain of the arms, an L-shaped head on each of the other arms, a cooperating L-shaped member pivotally connected to each arm carrying an L-shaped head at its junction therewith, a lever fixed to each L-shaped member adapted when the member is in a position to form in conjunction with its respective L-shaped head a cradle for the reception of coils of wire to lie parallel with its respective arm, and means to retain said lever in such position.

2. A wire reel comprising a hub, equally spaced arms radiating from the hub, U-shaped heads on the outer ends of certain of the arms, an L-shaped head on each of the other arms, a cooperating L-shaped member pivotally connected to each arm carrying an L-shaped head at its junction therewith, a lever fixed to each L-shaped member adapted when the member is in a position to form in conjunction with its respective L-shaped head a cradle for the reception of coils of wire to lie parallel with its respective arm, and a yoke slidable on the respective arm to embrace the arm and its respective lever to hold the L-shaped member and L-shaped head in cradle forming position.

ALGOT W. JOHNSON.

REFERENCES CITED

The following references are of record in the file of this patent:

UNITED STATES PATENTS

| Number | Name | Date |
|---|---|---|
| 85,065 | Brown | Dec. 22, 1868 |
| 95,632 | Barker | Oct. 12, 1869 |
| 473,160 | Livengood | Apr. 19, 1892 |
| 481,306 | Miller et al. | Aug. 23, 1892 |